(12) United States Patent
Daugherty, Jr. et al.

(10) Patent No.: US 9,391,393 B2
(45) Date of Patent: Jul. 12, 2016

(54) CONNECTOR BACKSHELL HAVING MULTIPLE CABLE EXIT CONFIGURATIONS

(71) Applicant: DELPHI TECHNOLOGIES, INC., Troy, MI (US)

(72) Inventors: Robert Earl Daugherty, Jr., Irvine, CA (US); Cesar A. Mora, Laguna Niguel, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/434,853

(22) PCT Filed: Oct. 1, 2013

(86) PCT No.: PCT/US2013/062789
§ 371 (c)(1),
(2) Date: Apr. 10, 2015

(87) PCT Pub. No.: WO2014/074245
PCT Pub. Date: May 15, 2014

(65) Prior Publication Data
US 2015/0303615 A1     Oct. 22, 2015

Related U.S. Application Data

(60) Provisional application No. 61/723,841, filed on Nov. 8, 2012.

(51) Int. Cl.
*H01R 13/58*     (2006.01)
*G02B 6/38*     (2006.01)
(Continued)

(52) U.S. Cl.
CPC ............ *H01R 13/582* (2013.01); *G02B 6/3829* (2013.01); *G02B 6/3887* (2013.01); *H01R 13/512* (2013.01); *H01R 13/6581* (2013.01); *H01R 13/516* (2013.01); *H01R 13/52* (2013.01)

(58) Field of Classification Search
CPC ............................ G02B 6/3829; H01R 13/582
See application file for complete search history.

(56) References Cited

U.S. PATENT DOCUMENTS 2,369,570 A * 2/1945 Jalbert .................... H02G 3/00
                                                220/3.8
3,167,375 A * 1/1965 Sarazen ............... H01R 4/2404
                                                174/72 R
(Continued)

FOREIGN PATENT DOCUMENTS

EP     2276130 A2     1/2011
EP     2053701 B1     11/2012

OTHER PUBLICATIONS

International Search Report for PCT/US2013/062789, published Feb. 28, 2014.
(Continued)

*Primary Examiner* — Briggitte R Hammond
(74) *Attorney, Agent, or Firm* — Robert J. Myers

(57) ABSTRACT

A connector backshell assembly configured to interconnect a cable to a connector. The connector backshell assembly has multiple cable portals at exit angles, such as straight, 90 degree, and 45 degree relative to the connector. The connector backshell assembly is separable into two halves to allow easy access to the rear portion of the connector for connecting and servicing the cable/connector interface. Unused cable portals may be sealed with a plug. The connector backshell assembly may be used with various Military specification (Mil Spec) types including M38999, M28840, M28876, M5015, and M64266.

6 Claims, 3 Drawing Sheets

(51) Int. Cl.
*H01R 13/512* (2006.01)
*H01R 13/6581* (2011.01)
*H01R 13/516* (2006.01)
*H01R 13/52* (2006.01)

(56) References Cited

U.S. PATENT DOCUMENTS

| | | | | |
|---|---|---|---|---|
| 3,920,306 A | * | 11/1975 | Barnett, Jr. | H01R 9/00 439/459 |
| 4,392,701 A | * | 7/1983 | Weidler | H01R 31/02 439/405 |
| 4,761,145 A | * | 8/1988 | Goto | H01R 13/516 439/469 |
| 4,952,168 A | * | 8/1990 | Schieferly | H01R 13/501 439/467 |
| 5,143,868 A | * | 9/1992 | Caveney | H01R 13/73 439/535 |
| 5,492,489 A | * | 2/1996 | Chavakula | H01R 24/547 439/655 |
| 5,676,566 A | * | 10/1997 | Carlson, Jr. | G02B 6/3897 439/491 |
| 5,676,568 A | * | 10/1997 | Weber | H01R 24/20 439/457 |
| 5,831,815 A | * | 11/1998 | Miller | H01R 4/20 439/465 |
| 5,911,600 A | * | 6/1999 | Mosquera | H01R 31/02 439/655 |
| 6,422,891 B1 | * | 7/2002 | Huang | F21V 23/06 439/641 |
| 6,435,732 B1 | * | 8/2002 | Asao | G02B 6/387 439/455 |
| 6,884,099 B1 | * | 4/2005 | Cannon | H01R 11/18 439/314 |
| 7,399,201 B1 | * | 7/2008 | Khorsand | H01R 13/506 174/559 |
| 7,641,504 B1 | | 1/2010 | Padruzzi | |
| 8,257,106 B2 | * | 9/2012 | Fornage | H01R 13/639 439/304 |
| 8,435,066 B2 | | 5/2013 | Myong et al. | |
| 2007/0116413 A1 | | 5/2007 | Cox | |
| 2012/0051701 A1 | | 3/2012 | Sicari et al. | |

OTHER PUBLICATIONS

Performance Specification Sheet; MIL-PRF-64266/1A {online}; Department of Defense; Jan. 10, 2012 [retrieved Feb. 14, 2014]; Retrieved from the Internet: <URL: http://www.landandmaritime.dla.millDownloads/MilSpecIDocs/MIL-PRF-64266/prf64266ss1.pdf> pp. 1-3.

* cited by examiner

CONNECTOR BACKSHELL HAVING MULTIPLE CABLE EXIT CONFIGURATIONS

CROSS-REFERENCE TO RELATED APPLICATIONS

This application is a national stage application under 35 U.S.C. §371 of PCT Application Number PCT/US2013/62789 having an international filing date of Oct. 1, 2013, which designated the United States, said PCT application claiming the benefit of priority under Article 8 of the Patent Cooperation Treaty to U.S. Provisional Patent Application No. 61/723,841, filed Nov. 8, 2012, the entire disclosure of each of which are hereby incorporated herein by reference.

TECHNICAL FIELD OF THE INVENTION

The invention generally relates to a connector backshell assembly that may be used to attach connectors to cables.

BACKGROUND OF THE INVENTION

A backshell is a component that is designed to be placed around that portion of a connector which contains the facilities for attaching electrical wires or cables to the connector. A backshell may also be referred to as a hood. A backshell may be designed to provide the accommodations between an electrical cable clamping device and an electrical connector shell. It may further include the clamping device. A backshell may alternatively be used to attach fiber optic cables to a fiber optic connector. It may be used for shielding the connector and cable against electromagnetic interference, mechanical damage, or physical damage due to environmental conditions.

A backshell is used to shield the cable connection points of the inter-connecting cable and the connector. Some backshells include a cable clamp to secure the cable to the backshell and connector. A grommet that is sized to the outside diameter (OD) of the cable may also be used.

A basic feature of the backshell is to provide a protective enclosure for routing cable from the connector location to conduit, cable channels, bulkhead access, tie-down points, etc. In order to facilitate the routing of the cables, backshells are typically designed for one of three types of cable exit angles:

straight, wherein the cable exits in-line with the cable/connector longitudinal axis;

forty five degree wherein the cable exits at forty five degree angle relative to the cable/connector longitudinal axis; and ninety degree wherein the cable exits at ninety degree angle relative to the cable/connector longitudinal axis.

Backshells for military and aerospace connectors are typically designed for a particular military specification (Mil Spec) type or specific family of connector types. The backshells attach to these various connectors by way of accessory threads and teeth or splines on the rear of the connectors to lock them in place and prevent rotation. These threads and attachment configurations often vary between the various connector types and as a result, the backshells are not usually interchangeable between these different families of connectors.

Other features common to backshells are to providing electromagnetic interference/and/or radio frequency interference (EMI/RFI) protection by way of conductive metal shells or conductive plating, environmental protection, and providing strain relief by way of a cable clamp mechanism at the rear of the backshell.

The cable clamp mechanism may be unique to a particular application or connector backshell assembly. The cable clamp mechanism can serve multiple purposes. It can be used to capture the strain member of a cable (typically Kevlar fibers) or it can provide an attachment point for cable shielding to continue the EMI/RFI protection from cable to backshell to connector. The cable exit portal may also provide an attachment point for a variety of cable conduits or tubing.

In the current backshell designs, the desired cable exit angle is attained by way of a different and unique connector backshell assembly for each of the cable exit angles. Changing the cable exit angle by changing a backshell may be complicated and sometimes unfeasible in a pre-existing cable assembly and not something easily accomplished in the field.

Another drawback of current backshell designs is that they are usually a one piece shell design. This does not allow for the backshell to be opened up to provide access to the rear of the connector for servicing of the cable terminations. The entire backshell may have to be disconnected and moved up the cable away from the connector.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

The inventors have developed a single backshell that can accommodate straight, forty-five degree, ninety degree cable exit angles or any combination thereof. The backshell can also include an adaptor to accommodate a variety of connector and cable clamp types.

In accordance with one embodiment of this invention, a connector backshell assembly is provided. The connector backshell assembly includes a first backshell housing and a second backshell housing configured to mate to the first backshell housing. The first backshell housing and the second backshell housing, when mated, define a connector portal configured to receive a connector device and having a connector portal axis, a first cable portal configured to receive a cable and having a first cable portal axis, and a second cable portal configured to receive a cable and having a second cable portal axis.

The first backshell housing and the second backshell housing the first backshell housing and the second backshell housing, when mated, define a third cable portal having a third cable portal axis and wherein an acute angle is defined between the connector portal axis and the second cable portal axis and a right angle is defined between the connector portal axis and the third cable portal axis. The connector portal axis may be substantially coaxial with the first cable portal axis and an angle defined between the connector portal axis and the second cable portal axis is selected from a group consisting of acute angle, right angle, and obtuse angle. A substantially forty-five degree angle may be defined between the connector portal axis and the second cable portal axis and a substantially ninety degree angle may be defined between the connector portal axis and the third cable portal axis.

The connector backshell assembly may further include a plug adapted to enclose at least one of the first cable portal and the second cable portal. The connector backshell assembly may further includes an adaptor that is disposed within the connector portal and configured to a couple a connector to the first backshell housing and the second backshell housing. The connector may be selected from a group consisting of Mil Spec Type M38999, M28840, M28876, M5015, and M64266 connectors.

In accordance with another embodiment of this invention, a connector backshell assembly includes a first backshell housing and a second backshell housing that, when mated, define a third cable portal in a location substantially opposite the second cable portal.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

The present invention addresses many of the limitations and restrictions of the currently available Mil Spec type backshells for the military and aerospace connectors. This backshell design may be is used for, but is not limited to, circular Mil Spec type electrical and fiber optic connector/cable assemblies.

Figure 1:
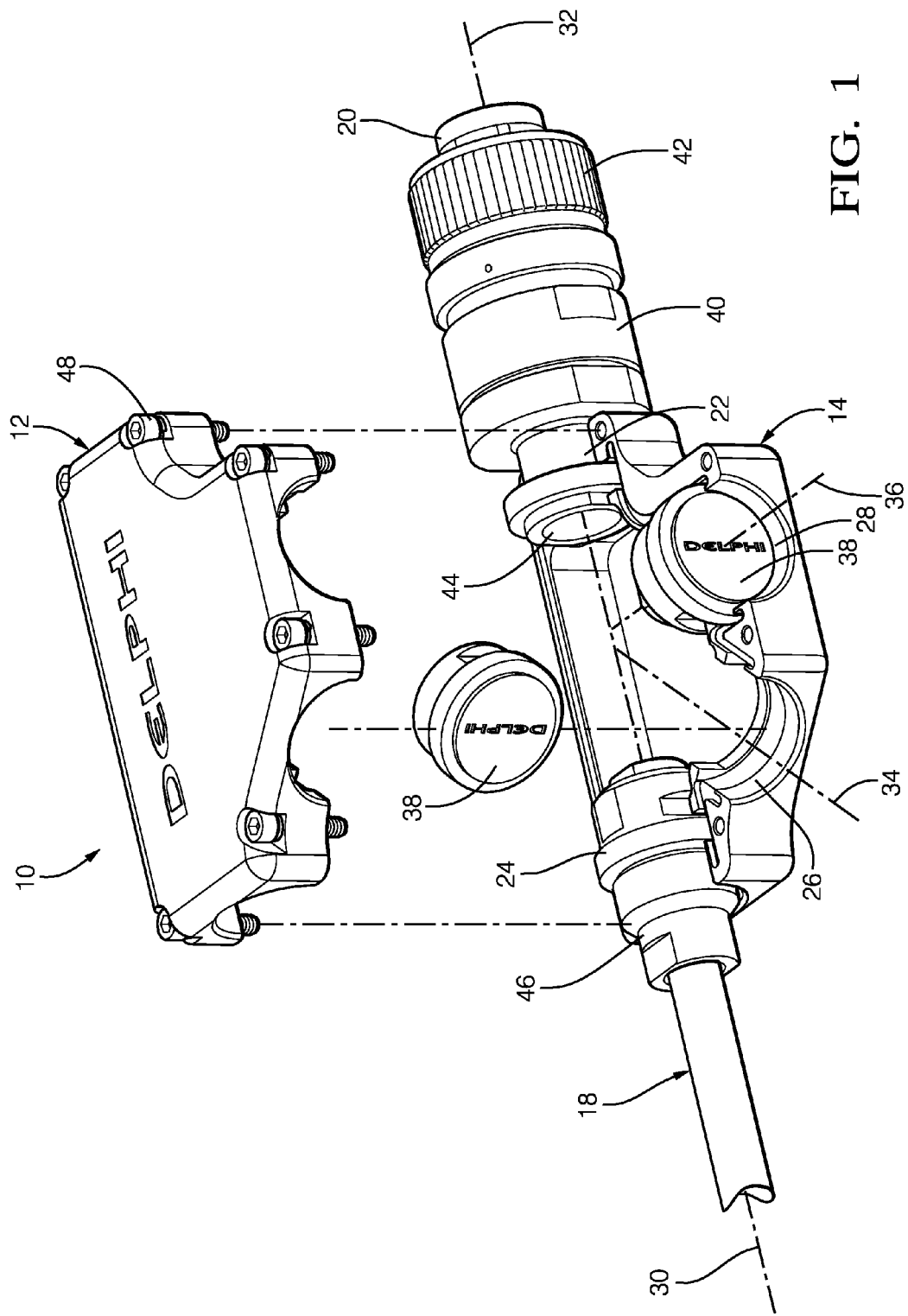
FIG. 1 is an exploded perspective view of a connector backshell in accordance with one embodiment.
Figure 2:
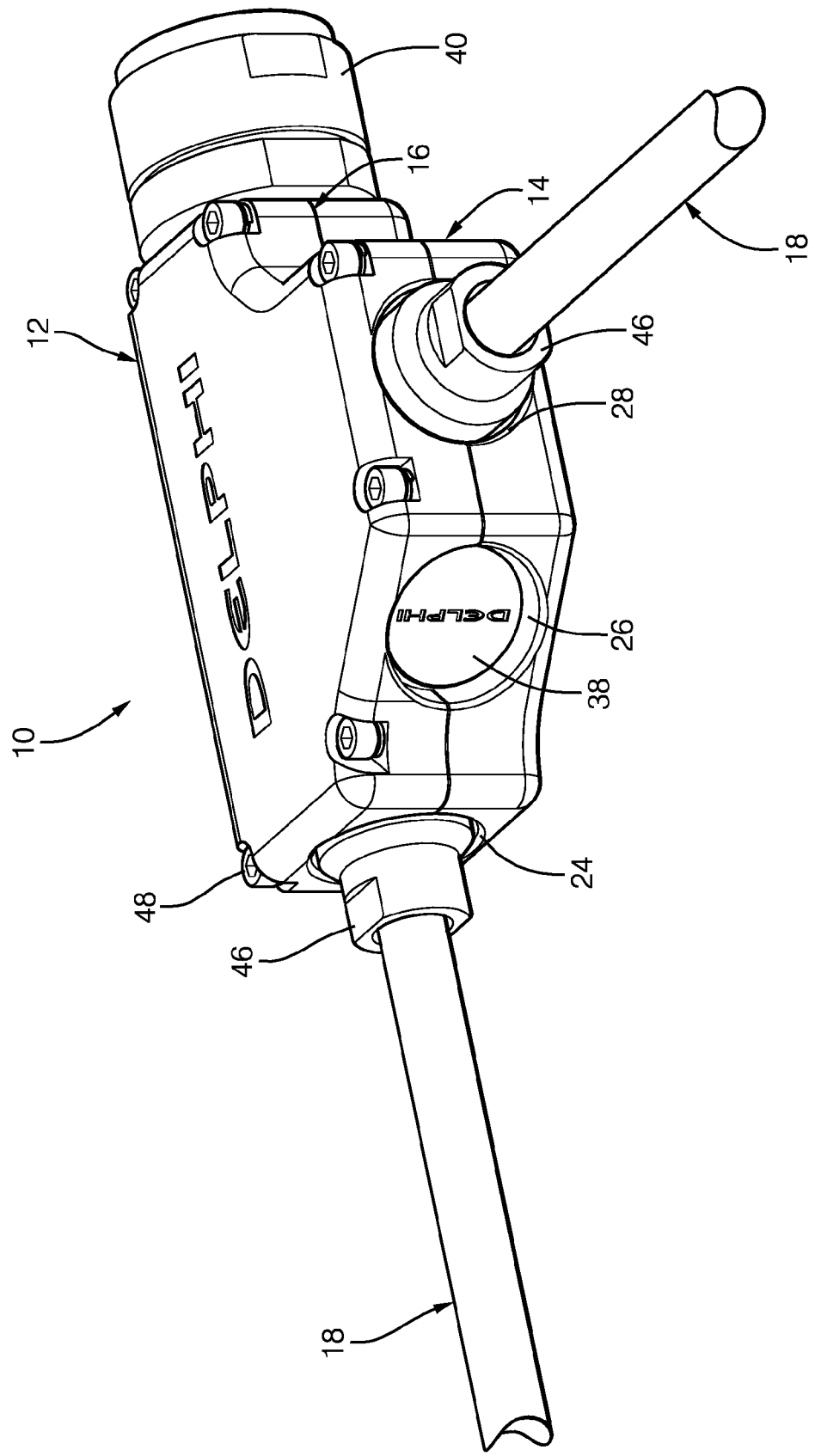
FIG. 2 is a perspective view of a connector backshell assembly in accordance with the embodiment of FIG. 1.

FIGS. 1 and 2 illustrate a non-limiting example of a connector backshell assembly 10 according to one embodiment. The connector backshell assembly 10 includes a housing having two halves 12, 14 that are complementarily shaped to form a backshell housing 16 for a cable 18 and connector 20 when they are assembled. The backshell housing 16 defines several portals: a connector portal 22 and at least two cable portals 24, 26. The connector portal 22 and cable portals 24, 26 in the illustrated embodiment are circular, but portals of other shapes, including elliptical, square, or rectangular may also be used. Each portal 22, 24, 26 defines an axis 30, 34, 36. The backshell housings may be designed so that the connector portal axis 32 and the cable portal axes 30, 34 are substantially co-planar. As used herein, substantially coplanar means that the axes are ±5 millimeters and ±5 degrees of absolutely co-planar. As illustrated in FIG. 1, the housing may define three cable portals 24, 26, 28. The first cable portal axis 30 is substantially coaxial with the connector portal axis 32. As used herein, substantially coaxial means that the first cable portal axis 30 is substantially coaxial with the connector portal axis 32, i.e. ±5 millimeters from each other and define angles that are ±5 degrees of absolutely coaxial. The second cable portal axis 34 defines an acute angle (in certain embodiments a substantially forty-five degree (45°) angle) relative to the connector portal axis 32 and the third cable portal axis 36 defines a right, i.e. substantially ninety degree (90°), angle relative to the connector portal axis 32. As used herein, a substantially forty-five degree angle and a substantially ninety degree angle means that the angles are ±5 degrees of forty-five and ninety degrees respectively.

When the two halves 12, 14 of the backshell housing 16 are assembled, the choice of exit angle(s) may be selected and the cable 18 is routed through the appropriate cable portal(s) 24, 26, 28. The unused cable portal(s) 24, 26, 28 may then be closed off with a plug 38 to seal the unused cable portal(s) 24, 26, 28 and preserve the environmental integrity of the connector backshell assembly 10. The plug 38 may include a compliant seal to seal the unused cable portal(s) 24, 26, 28 against contaminants such as fluids, dirt, and dust. The plug 38 may include ridges or grooves that mate with corresponding grooves or ridges in the backshell housing 16 to provide positive retention and location of the plug 38 within the unused cable portal(s) 24, 26, 28. These plugs 38 provides the connector backshell assembly 10 with an ability to provide cable exit points or cable portals 24, 26, 28 at forty-five degrees, ninety degrees, one hundred eighty degrees, or any combination thereof, relative to the connector 20.

The connector portal 22 may be designed to be coupled to a variety of connector adaptors 40 that are designed to accommodate the rear accessory attachment features of Mil Spec connectors, including but not limited to, M38999, M28840, M28876, M5015, and M64266.

When the connector backshell assembly 10 is assembled, a connector 20 may be selected and the corresponding connector adaptor 40 may be chosen. Each connector adaptor 40 may be specific to the thread and tooth/spline configuration of a particular connector 20. This connector adaptor 40 will become an integral part of the connector backshell assembly 10 during assembly. The connector adaptor 40 may be attached to the connector 20 by a rotating threaded coupling mechanism 42 that is part of the connector adaptor 40.

The connector backshell assembly 10 may include a variety of cable exit adaptors 46 that are configured to accommodate different cable 18 types and sizes. Cable exit adaptors 46 may be designed to accommodate, but are not limited to, electrical cables, fiber optic cables, cables with strain relief fibers (such as KEVLAR), cables with braided EMI/RFI shielding, cables routed through conduit or convoluted tubing, jacketed cables, etc.

The connector backshell assembly 10 can be formed of aluminum alloy or other similar metal alloys, and could be manufactured by machining, die cast, metal injection molding (MIM), investment casting, or any other metal-working process well known to persons skilled in the art. The connector backshell assembly 10 may also be formed of formed of a conductive thermoplastic material, for example a polybutylene terephthalate (PBT) plastic filled with nickel plated carbon fibers. Such a material is available from ElectriPlast Corporation of Fort Washington, Pa. In applications where electrical conductivity is not required of the connector backshell assembly 10, the connector backshell assembly 10 can be made of a non-conductive plastic such as PBT, polypropylene (PP), or polyamide (NYLON) and manufactured by standard machining, or plastic molding processes well known to persons skilled in the art.

After the connector backshell assembly 10 is assembled, the two halves 12, 14 of the backshell housing 16 may later be separated to allow access for servicing the cable terminations on the rear side 44 of the connector 20. This provides a benefit of simplifying service of the rear side 44 of the connector 20 in the connector backshell assembly 10 compared to a one piece connector backshell assembly.

The two halves 12, 14 of the backshell housing 16 may include features that allow them to be secured to one another with threaded fasteners 48, such as machine screws. By using standard screw head types, such as slot, hex socket, cross socket (PHILLIPS), or star socket (TORX) heads, the connector backshell assembly 10 may be separated and field-serviceable without the need of special tools. Alternatively, the two halves 12, 14 of the backshell housing 16 may be secured with non-threaded fasteners, such as clips or quarter turn (DZUS) fasteners. Still yet alternatively the two halves 12, 14 of the backshell housing 16 may be permanently secured to one another by adhesives, rivets, or ultrasonic welding if serviceability is not required.

Figure 3:
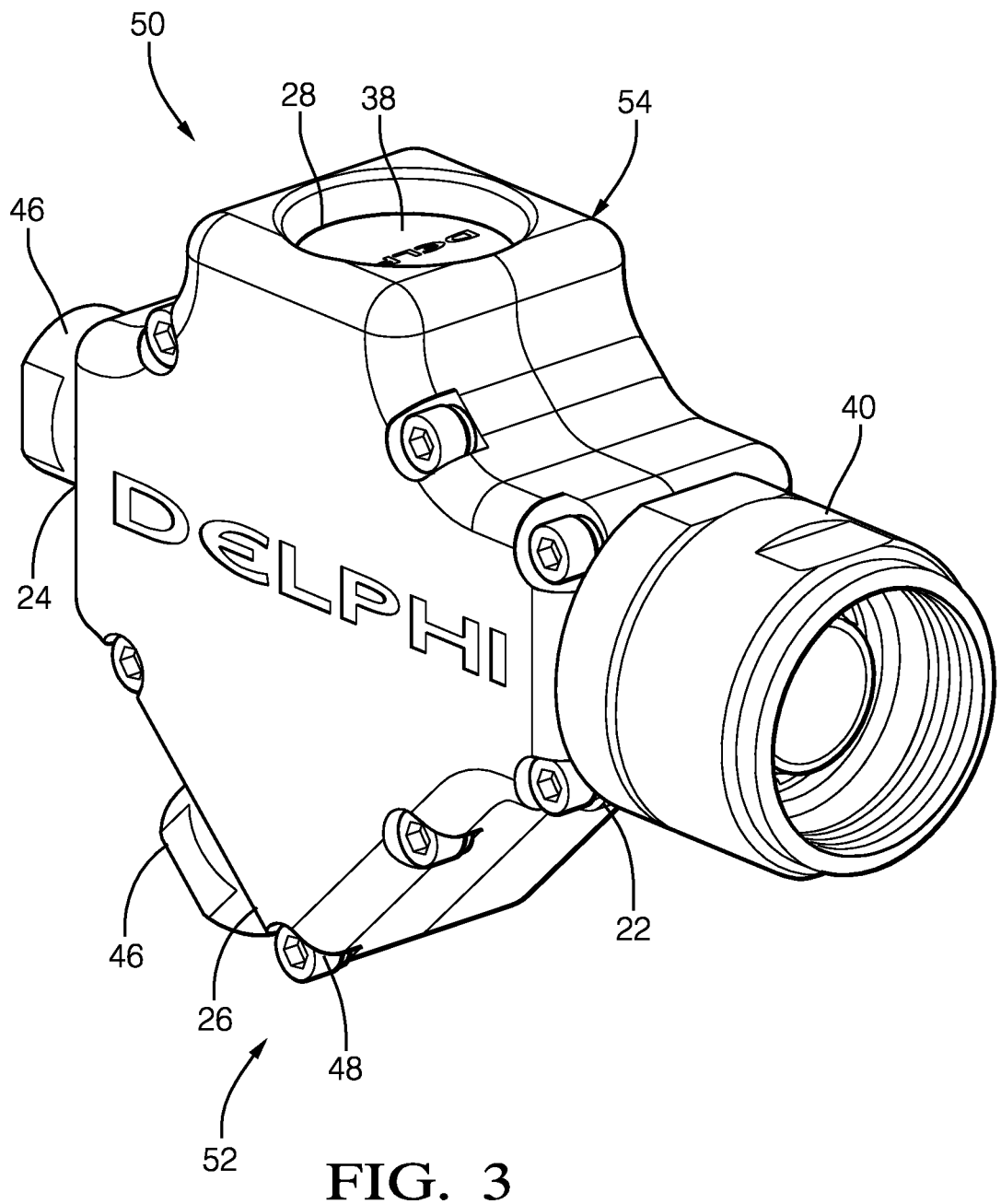
FIG. 3 is a perspective view of a connector backshell assembly in accordance with another embodiment.

FIG. 3 illustrates an alternative embodiment of a connector backshell assembly 50. As opposed to the connector backshell assembly 10 shown in FIGS. 1 and 2 where the second cable portal 26 and the third cable portal 28 are in relatively close proximity to each other, that is they are both on one side of the backshell housing 16, the connector backshell assembly 50 of FIG. 3 has the second cable portal 26 disposed on one side of the backshell housing 52, e.g. the bottom side, while the third cable portal 28 is disposed on an opposing side of the backshell housing 54, e.g. the top side. This may provide the benefit of a connector backshell assembly 50 that is slightly more compact compared to the connector backshell assembly 10.

In an embodiment of the connector backshell assembly 10, 50, the location of or distances between, the cable portals 24, 26, 28 relative to the connector portal 22 may be configured so that the insulation strip length of the cable 18 is the same no matter which cable portal 24, 26, 28 is utilized.

Accordingly, a connector backshell assembly 10, 50 is provided. The connector backshell assembly provides a single backshell that can be used with various cable/connector orientations, e.g. straight, forty five, and ninety degree. This provides the benefit of reducing the number of backshell types that must be stocked to manufacture and service cable connector assemblies. The connector backshell assembly 10, 50 also provides the benefit of reusing the same connector backshell if the cable/connector orientation must be changed after the cable assembly is manufactured. The connector backshell assembly 10, 50 further provides the ability to connect more than one cable to the connector.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A connector backshell assembly, comprising:
   a first backshell housing; and
   a second backshell housing configured to mate to said first backshell housing, wherein the first backshell housing and the second backshell housing, when mated, define
      a connector portal configured to receive a connector device and having a connector portal axis,
      a first cable portal configured to receive a cable and having a first cable portal axis, coaxial with the connector portal axis;
      a second cable portal configured to receive a cable and having a second cable portal axis, wherein the connector portal axis and the second cable portal axis define an acute angle therebetween; and
      a third cable portal configured to receive a cable and having a third cable portal axis, wherein the connector portal axis and the third cable portal axis define a right angle therebetween and wherein the first, second, and third cable portals are configured so that a distance between each of the first, second, and third cable portals relative to the connector portal is configured so that an insulation strip length of the cable is the same when any of the first, second, and third cable portals is utilized.

2. The connector backshell assembly according to claim 1, wherein the acute angle is a substantially forty five angle.

3. The connector backshell assembly according to claim 1, wherein the first backshell housing and the second backshell housing, when mated, define the third cable portal in a location substantially opposite the second cable portal.

4. The connector backshell assembly according to claim 1, wherein the connector backshell assembly further comprises a plug enclosing at least one of the first cable portal, the second cable portal, and the third cable portal.

5. The connector backshell assembly according to claim 1, wherein the connector backshell assembly further comprises a connector device.

6. The connector backshell assembly according to claim 5, wherein the connector backshell assembly further comprises an adaptor disposed within the connector portal and configured to a couple the connector device to the first backshell housing and the second backshell housing.

* * * * *